United States Patent [19]

Gonzi

[11] Patent Number: 4,633,111
[45] Date of Patent: Dec. 30, 1986

[54] ACTUATOR OF LINEAR MOTION, WITH A RACK-LIKE MEMBER AND A ROTATING MEMBER

[76] Inventor: Mario Gonzi, Via Montarfoni 65, Ponticino-Laterina, Italy, 52020

[21] Appl. No.: 728,190

[22] Filed: Apr. 29, 1985

[30] Foreign Application Priority Data

May 8, 1984 [IT] Italy .................................. 9393 A/84

[51] Int. Cl.⁴ .............................................. H02K 7/12
[52] U.S. Cl. ........................................ 310/80; 310/83; 74/57
[58] Field of Search ..................................... 310/80–83, 310/75 R; 74/57

[56] References Cited

U.S. PATENT DOCUMENTS

| | | | |
|---|---|---|---|
| 2,479,019 | 8/1949 | Ochtman | 310/83 UX |
| 2,696,579 | 12/1954 | Van der Veer | 310/83 UX |
| 3,619,675 | 11/1971 | Baker | 310/80 X |
| 3,714,479 | 1/1973 | Moore et al. | 310/83 X |
| 3,792,616 | 2/1974 | Wentzel | 74/57 |
| 4,198,872 | 4/1980 | Metz | 74/57 |
| 4,489,248 | 12/1984 | Petersen | 310/80 X |

Primary Examiner—Donovan F. Duggan
Attorney, Agent, or Firm—Hopgood, Calimafde, Kalil, Blaustein & Judlowe

[57] ABSTRACT

The actuator of rapid linear variable motion comprises: a linear member—fixed or sliding—having a concave cylindrical surface with generatrices parallel to the direction of motion of said member, on which variable-pitch helix-like and shaped channels are formed; and a rotating member with its axis parallel to the linear member and provided with pegs angularly distributed and capable of coming in contact, one after the other, with limited contemporaneousness, with the channels of the linear member.

9 Claims, 4 Drawing Figures

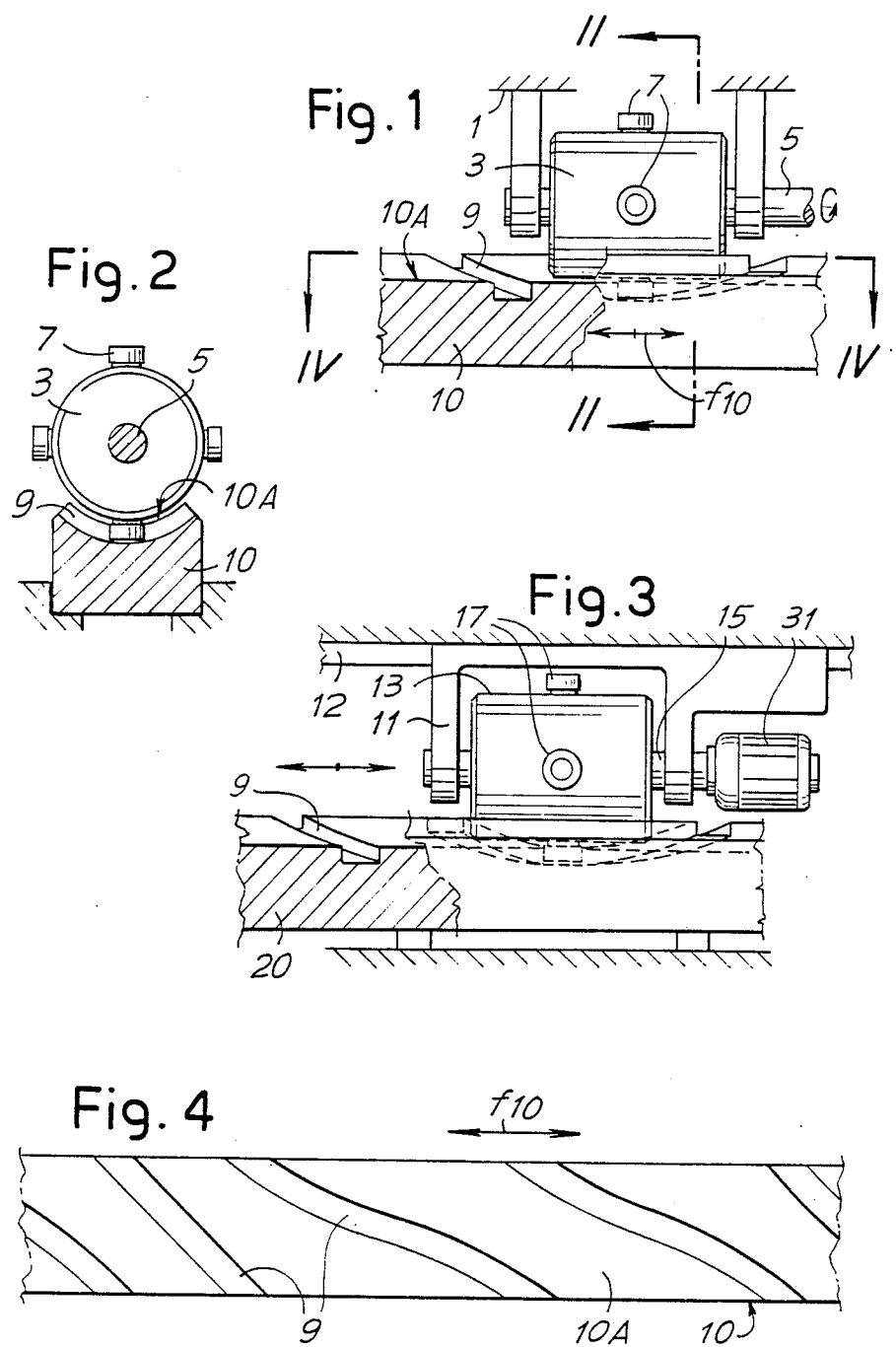

ACTUATOR OF LINEAR MOTION, WITH A RACK-LIKE MEMBER AND A ROTATING MEMBER

The invention relates to an actuator of linear motion with a rotating member and a member linearly movable with reciprocating motion, also rectilinear. The objects and advantages of the present actuator will be apparent from the following description.

Substantially, the actuator comprises: a member with linear and mostly rectilinear development, having a concave cylindrical surface with generatrices parallel to the extension of said member or similar, on which channels shaped with variable inclination are formed; and a rotating member with its axis parallel to the extension of said linear member, with radial projections angularly distributed and apt to engage, one after the other, in the shaped channels of the linear member. Each channel of the linear member is developed with each end inclined likewise the corresponding end of the adjacent channel, and the radial projections are predisposed each to engage a channel just before an adjacent projection leaves a corresponding adjacent channel.

The linear member can slide and form the driven member, and the rotating member can act as the driving member; or the linear member may be fixed, and the rotating member is carried by a group to be moved with the desired law of motion and carries the rotating member with a motor being installed on said group; or the linear member is the driving one and the rotating member is the driven one. During the cycle, the driven member may be subjected to even lengthy stops as well as to reversals of motion.

The rotating member has at least three radial projections which are developed to act as rollers.

The invention will be better understood by a reading of the following description and the accompanying drawing, which shows a practical non limitative exemplification of the same invention. In the drawing:

FIG. 1 shows a side view, and

FIG. 2 shows a view in section on line II—II of FIG. 1 of a first embodiment;

FIG. 3 shows—similarly to FIG. 1—a diagram of a second embodiment; and

FIG. 4 shows a view according to line IV-IV of FIG. 1.

According to the first diagram of FIGS. 1 and 2, numeral 1 indicates a fixed structure which acts as a support for a driving member made up of a driving pinion-like drum 3 which is provided with constant rotation movement with input from the shaft 5 of said member 3. This member 3 has a plurality of pegs or rollers 7 developed as radial projections at positions angularly distributed along a circumference; the pegs or rollers 7 are able to engage in the inside of channels 9 of a linear slide-like structure 10 (improperly considerable similar to a rack), capable of sliding in the direction shown by the dual arrow f10 and parallel to the axis of the member 3, 5. The slide 10 has a concave profile 10A matching with the profile of the drum 3 and has the channels 9 along the surface 10A, likewise a rack. Channels 9 are variously shaped as it results from FIG. 4, since they present variable inclinations respect to the sliding direction indicated by the dual arrow f10; in addition, the single channels will partially interfere with the channels adjacent to the ends, and the disposition of pegs 7 is such that a peg 7 engaging into a channel 9 leaves it shortly after an adjacent peg has in turn engaged the beginning of an adjacent channel 9; the lengths of the channels that are simultaneously engaged by two adjacent pegs have an equal inclination.

The driving member has constant speed, or in turn may be provided with motion variable in a cyclic way.

In the embodiment of FIGS. 1 and 2, the member 10 is supposed capable of sliding like a slide, the motion being variable according to laws defined by the sequence of the profiles of channels 9 which, by the rotation of the member 3, engage one after the other the pegs 7. The member 10 behaves like a sliding rack but being provided with a motion varying according to an indefinitely prolonged law dependent on the travel the member 10 provided with linear motion is asked for, and which is not bond to any repetition. The motion of the member 10 may be rectilinear or curved with slight curvature.

In the modified embodiment shown in FIG. 3, it is assumed that the rotating member 13 is carried by a group 11 linearly movable along guides 12 parallel to the development of a rack-like member 20 similar to the one designated by 10 but being fixed. This group 11, linearly movable, carries a motor 31 which drives the shaft 15 of member 13. The member 13 has pegs 17 similar to the ones indicated by 7, for engagement into the channels 9 of the rack like member 20. By the rotation of the member 13 driven by the motor 31 of the slide 11, the constant rotation imposed by the motor 31 is transformed in a motion with variable speed of the slide-like group 11, as a function of the law according to which the channels 9 of the linear rack-like fixed structure 20 are shaped and developping throught the whole travel which is required for the group or slide 11.

Substantially, the actuator according to the invention can realize; a rack translation at variable speed with a uniform rotation; or a displacement at variable speed of a truck respect to the rack being fixed, the truck carrying the member rotating with continuous and uniform motion thereon; or moreover—as an extreme case—a uniform and constant or non constant translation of the rack and the transformation of the linear motion in an angular motion of the member like the one 3 or 13, according to the law of variation imposed by the shape of channels 9. The rack or slide may be in turn motor-driven by a fluid-working cylinder-piston system, by a real rack mechanical system or other.

When the driving member is the member 10, one of its channels may also have a longitudinal length or even a shaping with a reversed length in order to achieve a stop or a reversal motion of the driven member.

The present actuator permits to obtain:

(1) linear translation with a travel from zero to infinity, with any law which does not require repetition:
(2) development of motions without distribution restraints;
(3) essentiality of components making up the apparatus;
(4) rationalization of the translations and liftings;
(5) lack of slides with longitudinal movement;
(6) possibility to assemble longitudinal sections of rack;
(7) versatility of the apparatus to be inserted in any technical application;
(8) reversibility or irreversibility obtained at will;
(9) possibility to replace advantageously pinion and toothed rack devices (even where they are already realized).

The actuator may be considered similar to a pinion and toothed rack device, with high mechanical efficiency, with a principle design apt for applications extending from very small up to relevant forces.

Potential specific applications of the present actuator can be listed as follows: linear connectors and disconnectors; linear pushers and/or traction devices handling of manipulator trucks; tilters; rotation of flags; precise linear rapid positioners; transferring of trucks or slides inserted in automatic groups; rigid and/or flexible transfers; impulse advancement; mounting plants or machines; horizontal or vertical conveyors; rigorously synchronized movements; precise movements with zero clearance; motions for which a whatever variable effort is necessary; quick movements where the optimum conditions in the power is required; precise automatic reference units; precise rapid introducers; lifting cells; multiple motions groups; mechanical presses; combined kinematic means operating at high frequency; rapid interlockings of rigid motions of flexible manipulators; any kind of motions either linear or rotating, where a predetermined acceleration, deceleration and approach ramp must be kept.

It will be understood that the drawing shows only an exemplification of the invention which may vary in the forms and dispositions.

I claim:

1. A kinematic mechanism comprising in combination a first member mounted for rotation about a central axis, said first member supporting a coplanar array of radially projecting fingers with said fingers having radially outer ends located on a circle centered on said axis in a plane normal to said axis, said fingers being circumferentially spaced about said circle, a second member having opposite side edges and a concave cylindrical surface extending between said side edges, said cylindrical surface having a plurality of adjacent channels formed therein which channels extend from one of said side edges to the other of said side edges crossing the generatrices of said cylindrical surface, said channels in succession in one direction that is parallel to said generatrices having their respective ends that intersect said one side edge centered about a respective plane that is normal to the generatrices of said cylindrical surface and that passes through the center of the end of the next adjacent channel in said succession which last mentioned channel end intersects said other side edge, the inclination, at any point along its length, of the longitudinal axis of each of said channels relative to said generatrices being selected to provide a predetermined desired motion, said inclination at the end of each of said channels that intersects said one side edge being the same as the inclination of the next adjacent channel in said succession at its respective end that intersects said other side edge, and means supporting said two members with said generatrices parallel to said central axis of said first member and with at least one of said finger outer ends engaged in one of said channels, said means supporting one of said two members for linear movement along a path parallel to said generatrices, the arrangement being such that as said first member rotates an advancing finger end enters one of said channels before the leading finger end exits from the adjacent channel.

2. A kinematic mechanism according to claim 1, wherein said means supporting said two members supports said second member for said linear movement, and means coupled in driving relation to said second member for imparting said linear movement thereto, whereby said first member is driven by said second member.

3. A kinematic mechanism according to claim 1, wherein said means supporting said two members supports said first member for said linear movement, and motive means are drivingly coupled to said first member while being supported for linear movement therewith for imparting rotation to said first member, said second member being supported in fixed position whereby rotary motion imparted to said first member results in linear translation of said first member relative to said second member in accordance with said predetermined desired motion.

4. A kinematic mechanism according to claim 1, wherein said channels include at least one portion oriented parallel to the direction of movement of the driving member of said two members for introducing a dwell interval in the movement of the driven member.

5. A kinematic mechanism according to claim 1, wherein said channels include at least one portion having an inclination for imparting a reversal in the direction of said linear movement as between said two members.

6. A kinematic mechanism according to claim 1, wherein said cylindrical surface is concentric with said circle.

7. A kinematic mechanism according to claim 1, wherein said outer ends of said projecting fingers comprise respective rollers for engaging in said channels sequentially.

8. A kinematic mechanism according to claim 1, wherein there are three of said fingers equidistantly spaced circumferentially about said first member.

9. A kinematic mechanism according to claim 1, wherein there are four of said fingers equidistantly spaced circumferentially about said first member.

* * * * *